United States Patent Office 3,318,170
Patented May 9, 1967

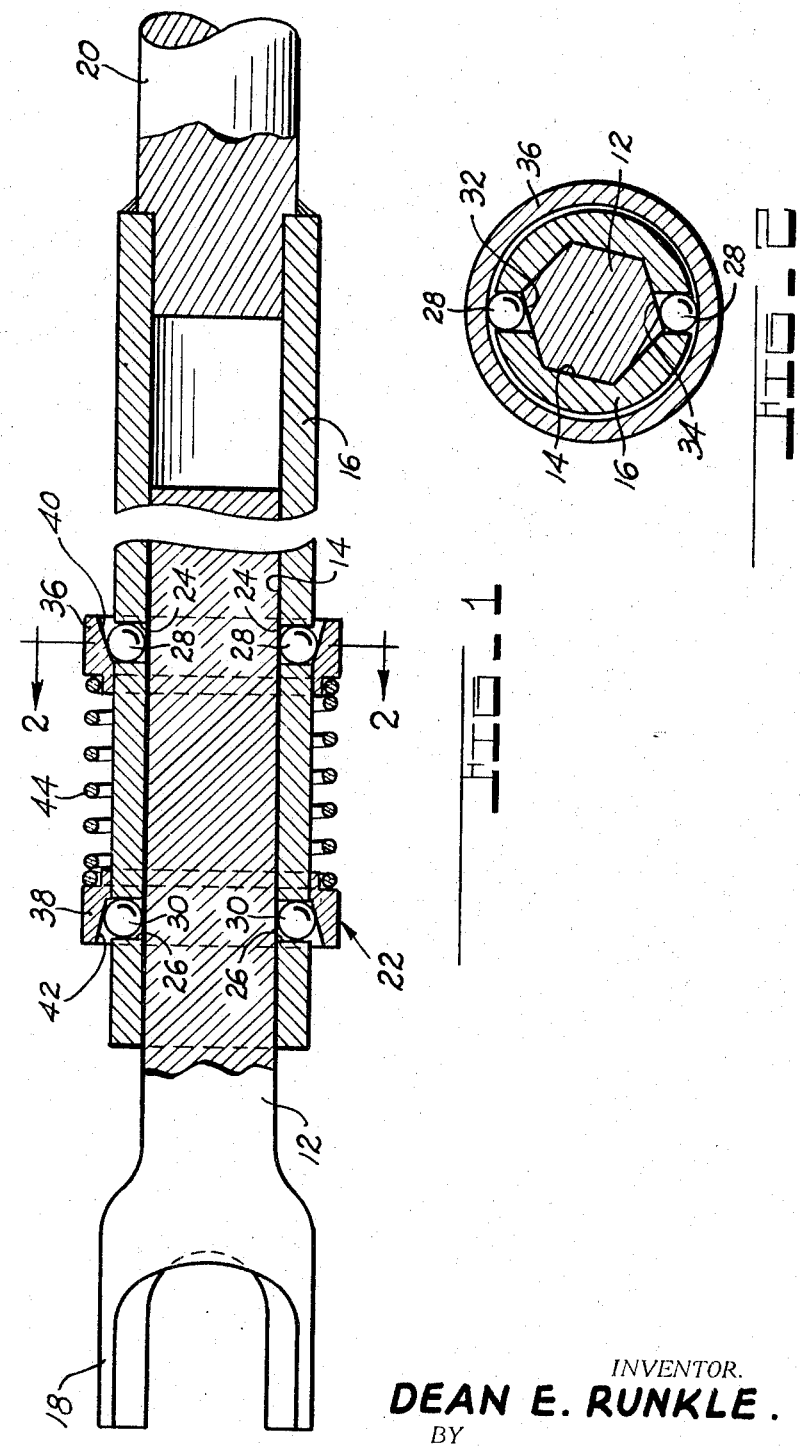

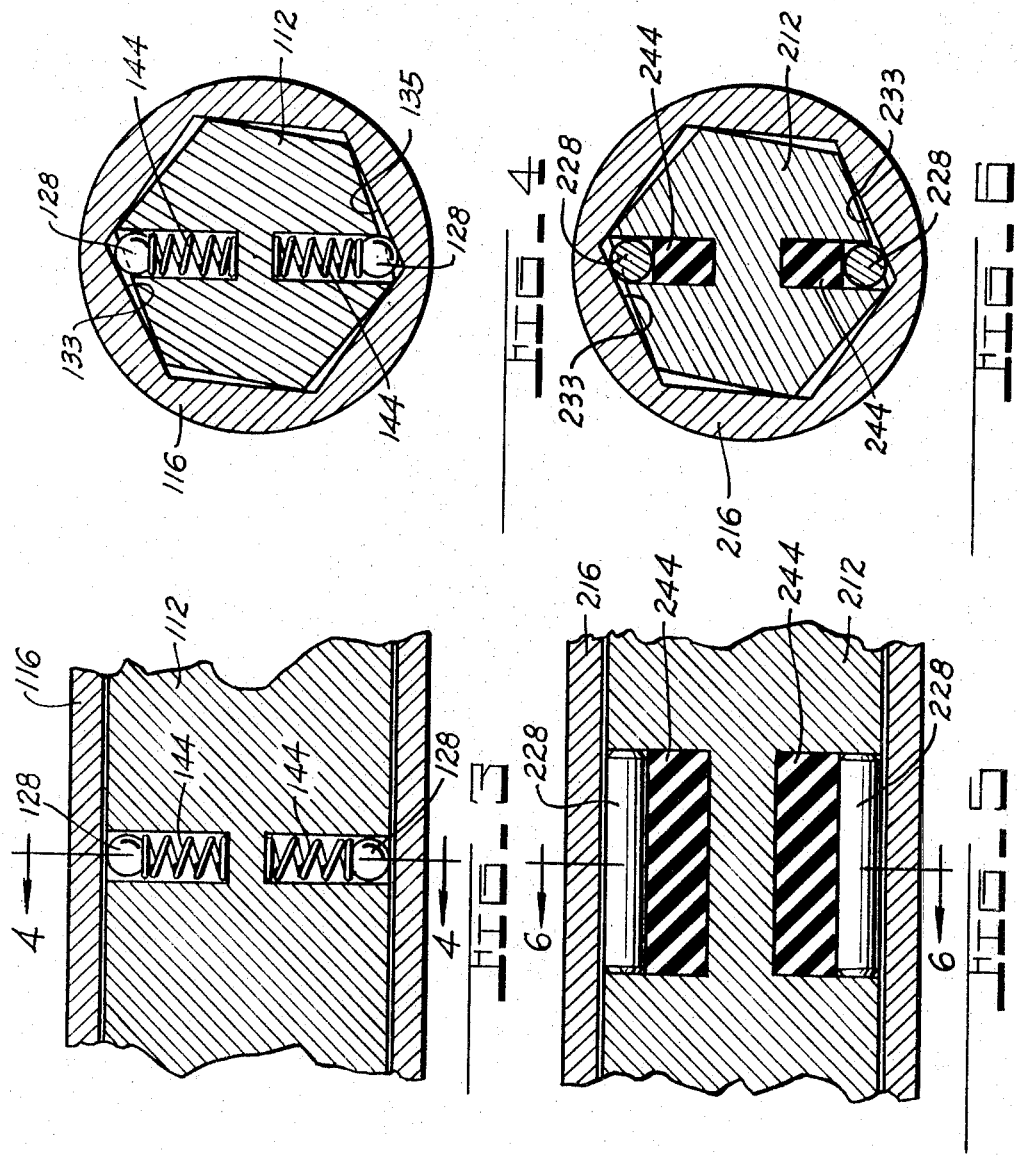

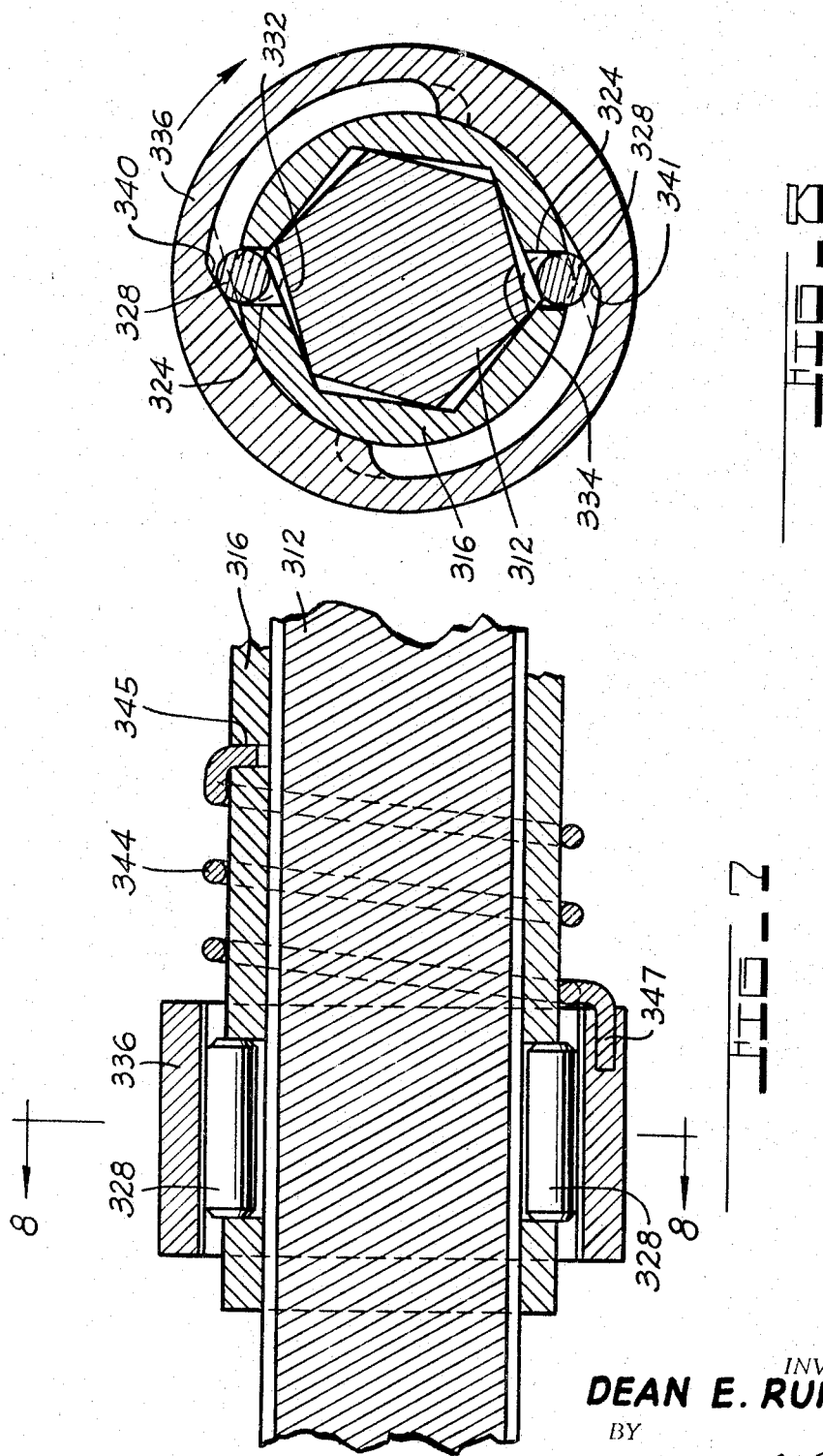

3,318,170
NO-LASH AXIALLY MOVABLE STEERING COLUMN
Dean E. Runkle, South Bend, Ind., assignor to The Bendix Corporation, a corporation of Delaware
Filed Aug. 5, 1965, Ser. No. 477,537
17 Claims. (Cl. 74—493)

This invention relates to the steering column of a vehicle and more particularly to an axially adjustable steering column.

The present practice in most vehicles is to provide an adjustable driver's seat so that the most comfortable position relative to the accelerator, brake, or other control pedals can be attained by the driver, as determined by the length of the driver's legs. However, if the steering column and wheel cannot also be adjusted, the position of the steering wheel, more often than not, will be incorrect. Thus, if a short driver adjusts the seat to a forward position so that the control pedals may be reached, the steering wheel probably will be too close to the driver's body and may even touch it. On the other hand, a tall driver who has moved the seat rearwardly may find that the steering wheel is too far away for comfort.

Vehicle manufacturers, in order to eliminate the foregoing problems, have in some instances, made available axially and angularly adjustable steering columns which can be positioned relative to the driver's seat so that any normal driver regardless of his girth, size, or height will be comfortable and will have full control of the vehicle.

With the foregoing in mind, it is an object of this invention to provide an axially movable steering column which includes mechanism for eliminating torsional lost motion, commonly referred to as "lash", between the axially movable components of the steering column.

Another object of this invention is to provide, in an axially movable steering column having first and second shafts which are axially movable with respect to each other, mechanism operatively connected to said shafts for causing rotation and continuous frictional engagement of one of said shafts with respect to the other of said shafts to thereby eliminate torsional lash therebetween.

More specifically, it is an object of this invention to provide in an axially movable steering column of the type described, a first shaft having a polygonal shape and a second shaft having a corresponding polygonal bore therein for receiving said first shaft, radially extending passage means located in one of said shafts, and a plurality of spring loaded members located in said passage means, said spring loaded members each being in abutment with a different polygonal surface of the other of said shafts at a location off center of the abutting polygonal surface to cause rotation and continuous frictional engagement of one of said shafts with respect to the other of said shafts to thereby eliminate torsional lash therebetween.

A further object of this invention is to provide mechanism of the type described for eliminating torsional lash between the axially movable shafts of the steering column, said mechanism including preloaded members for obtaining a nonvarying sliding friction between the telescoping shafts.

The above and other objects and features of this invention will become apparent from the following description of the mechanism taken in connection with the accompanying drawings which form a part of this specification and in which:

FIGURE 1 is a sectional view of a portion of a steering column of a vehicle showing the axially movable components thereof and the mechanism incorporating the invention;

FIGURE 2 is a sectional view taken along line 2—2 of FIGURE 1;

FIGURE 3 is a sectional view of a portion of the steering column showing a second embodiment of the invention;

FIGURE 4 is a somewhat exaggerated sectional view taken along line 4—4 of FIGURE 3;

FIGURE 5 is a sectional view of a portion of the steering column showing a third embodiment of the invention;

FIGURE 6 is a somewhat exaggerated sectional view taken along line 6—6 of FIGURE 5;

FIGURE 7 is a sectional view of a portion of the steering column showing a fourth embodiment of the invention; and FIGURE 8 is a somewhat exaggerated sectional view taken along line 8—8 of FIGURE 7.

Referring to FIGURES 1 and 2, it will be seen that an axially movable shaft 12 having a hexagonal shape is located in a corresponding hexagonal bore 14 formed in a fixed shaft 16. Shaft 12 is suitably connected to the steering wheel (not shown) of a vehicle through means of a universal joint 18, only a portion of which is shown, whereas shaft 16 is suitably connected to the steering gear (not shown) of the vehicle through means of a shaft 20 welded thereto. By telescoping shaft 12 within shaft 16 it will be apparent that axial adjustment of the vehicle steering wheel can be accomplished simply by pushing or pulling on the steering wheel. Furthermore, in the event of an accident, injury to the driver will be minimized because the steering column can telescope upon impact.

Since it is impractical from a tolerance standpoint to make the telescoping shafts 12 and 16 lash free, a coupling mechanism indicated generally by the numeral 22 is utilized to maintain the two shafts in continuous frictional engagement at all times. The coupling mechanism includes first and second sets of diametrically opposed drilled passages 24 and 26 located in hollow shaft 16, which sets of passages are axially spaced from each other. Located in passages 24 and 26, respectively, are balls 28 and 30, said balls abutting opposed hexagonal surfaces 32 and 34 of shaft 12 at points off center of each hexagonal surface so that any forces exerted against the balls will create a couple, that is, a pair of equal parallel forces acting in opposite directions tending to produce rotation. Rings 36 and 38 surround the balls 28 and 30, respectively, said rings each having circumferentially extending ramps 40 and 42 on the inner surface thereof which contact the balls 28 and 30. A compression spring 44 is located between the rings and urges them in opposite directions so that the ramps will cause movement of the balls in an inward direction. Such inward movement of the balls causes rotation of shaft 12 with respect to shaft 16 to thereby eliminate torsional lash therebetween. By controlling the preload on the spring and consequently on the balls, it is possible to obtain a nonvarying sliding friction between the telescoping members. Furthermore, by utilizing two sets of balls and two rings with oppositely angled ramps, the force required to move the steering shaft axially in either direction will be the same. If only one set of balls and one ring were utilized, axial movement of the shaft against the ramp would require a greater force than in the opposite direction which would be away from the ramp.

FIGURES 3 and 4 show an outside-in version of the invention wherein like parts are designated with like numerals plus 100. It will be noted that in this version the diametrically opposed drilled passages are located in movable shaft 112 and that the balls 128 which are located therein are urged again opposed internal hexagonal surfaces 133 and 135 of shaft 116 by compression springs 144. By locating the balls off center of the hexagonal surface, it will be noted from FIGURE 4, which is an exaggerated section, that the couple produced by the preloaded balls causes rotation and continuous frictional engagement of the inner shaft with respect to the outer shaft so as to eliminate torsional latch therebetween.

FIGURES 5 and 6 show another outside-in version of the invention wherein like parts are designated with like numerals plus 200. In this version cylindrical rollers 228 are utilized instead of balls to provide line contact with the outer shaft 216, and resilient rubber blocks 244 are utilized in place of coil springs to provide the necessary preload. Except for these differences, the elimination of torsional lash is accomplished in essentially the same manner as in the FIGURE 3 embodiment.

FIGURES 7 and 8 show another embodiment of the invention wherein like parts are designated with like numerals plus 300. In this embodiment the coupling mechanism includes diametrically opposed slots 324, located in hollow shaft 316, which contain cylindrical rollers 328. The cylindrical rollers abut opposed hexagonal surfaces 332 and 334 of shaft 312 along lines located off center of each hexagonal surface so that a couple will be created. A ring 336 surrounds the cylindrical rollers, said ring having a pair of opposed axially extending ramps 340 and 341 each of which is in contact with one of the rollers. A torsionally loaded spring 344, one end of which is suitably connected to shaft 316 at 345 and the other end of which is suitably connected to ring 336 at 347, urges the ring in a circumferential direction so that the ramps 340 and 341 cause the rollers 328 to move inwardly against hexagonal surfaces 332 and 334 to thereby cause rotation and continuous frictional engagement of the inner shaft with respect to the outer shaft. Although the use of cylindrical rollers is preferred in this embodiment, it will be understood that balls could be substituted in place thereof.

The several practical advantages which flow from this type of an adjustable steering column arrangement are believed to be obvious from the above, and other advantages may suggest themselves to those who are familiar with the art to which this invention relates.

Furthermore, although this invention has been described in connection with certain specific embodiments, it will be obvious to those skilled in the art that various changes may be made in the form, structure, and arrangement of parts without departing from the spirit of the invention. For example, shafts having polygonal shapes and corresponding bores other than hexagonal would be suitable in the practice of this invention. Accordingly, I do not desire to be limited to the specific embodiments disclosed herein primarily for purposes of illustration, but instead desire protection falling within the scope of the appended claims.

Having thus described the various features of the invention, what I claim as new and desire to secure by Letters Patent is:

1. An axially movable steering column comprising first and second shafts, one of which is axially movable with respect to the other of said shafts, said first shaft having a polygonal shape and said second shaft having a corresponding polygonal bore therein for receiving said first shaft, radially extending passage means located in one of said shafts, and a plurality of spring loaded members located in said passage means, said spring loaded members each being in abutment with a different polygonal surface of the other of said shafts at a location off center of the abutting polygonal surface to cause rotation and continuous frictional engagement of one of said shafts with respect to the other of said shafts to thereby eliminate torsional lash therebetween.

2. An axially movable steering column, as defined in claim 1, wherein said first shaft is formed in the shape of a hexagon and said bore of said second shaft is formed in the shape of a corresponding hexagon.

3. An axially movable steering column, as defined in claim 1, wherein said spring loaded members are located diametrically opposite each other.

4. An axially movable steering column, as defined in claim 3, wherein said spring loaded members are spherical.

5. An axially movable steering column, as defined in claim 3, wherein said spring loaded members are cylindrical.

6. An axially movable steering column, as defined in claim 1, wherein said radially extending passage means are located in said first shaft.

7. An axially movable steering column, as defined in claim 6, wherein said members are spring loaded through means of compression spring means located in said passage means for urging said members in a radially outward direction against said second shaft.

8. An axially movable steering column, as defined in claim 1, wherein said radially extending passage means are located in said second shaft.

9. An axially movable steering column, as defined in claim 8, wherein said members are spring loaded through means of a ring telescoped over said first and second shafts, said ring having ramp means on the inner surface thereof in contact with said members, and spring means operatively connected to said ring for urging said ring in a direction whereby said ramp means causes inward movement of said members against said first shaft.

10. An axially movable steering column, as defined in claim 9, wherein said ramp means extends circumferentially within said ring, and said spring means urges said ring in an axial direction.

11. An axially movable steering column, as defined in claim 10, wherein said spring means is a compression spring.

12. An axially movable steering column, as defined in claim 9, wherein said ramp means extends axially within said ring, and said spring means urges said ring in a circumferential direction.

13. An axially movable steering column, as defined in claim 12, wherein said spring means is a torsion spring.

14. An axially movable steering column comprising first and second shafts, one of which is axially movable with respect to the other of said shafts, said first shaft having a polygonal shape and said second shaft having a corresponding polygonal bore therein for receiving said first shaft, and means operatively connected to said first and second shafts for causing rotation and continuous frictional engagement of one of said shafts with respect to the other of said shafts to thereby eliminate torsional lash therebetween.

15. An axially movable steering column comprising first and second shafts, one of which is axially movable with respect to the other of said shafts, said first shaft having a polygonal shape and said second shaft having a corresponding polygonal bore therein for receiving said first shaft, first diametrically opposed passages located in said second shaft, second diametrically opposed passages located in said second shaft and axially spaced from said first diametrically opposed passages, a plurality of movable members, one of which is located in each of said passages, said movable members being in abutment with opposite polygonal surfaces of said first shaft at a location off center of said abutting polygonal surfaces, a first ring telescoped over said first and second shafts, said first ring having circumferentially extending ramp means on the inner surface thereof in contact with the members in said first diametrically opposed passages, a second ring telescoped over said first and second shafts, said second ring having a circumferentially extending ramp means on the inner surface thereof in contact with the members in said second diametrically opposed passages, and a compression spring located between and in abutment with said first and second rings for urging said rings in opposite directions so that said ramp means cause inward movement of the members located in said first and second diametrically opposed passages and consequent rotation of said first shaft with respect to said second shaft to thereby eliminate torsional lash therebetween.

16. An axially movable steering column comprising first and second shafts, one of which is axially movable with respect to the other of said shafts, said first shaft having a polygonal shape and said second shaft having a corresponding polygonal bore therein for receiving said first shaft, diametrically opposed passages located in said second shaft, a pair of movable members, one of which is located in each of said passages, said movable members being in abutment with opposed polygonal surfaces of said first shaft at a location off center of said abutting polygonal surfaces, a ring telescoped over said first and second shafts, said ring having a pair of opposed axially extending ramp means on the inner surface thereof, each of which is in contact with one of said movable members, and a torsion spring operatively connected to said ring and said second shaft for urging said ring in a circumferential direction so that said ramp means cause inward movement of said members and consequent rotation of said first shaft with respect to said second shaft to thereby eliminate torsional lash therebetween.

17. An axially movable steering column, as defined in claim 16, wherein said movable members are cylindrical and extend axially with respect to said shafts.

References Cited by the Examiner
UNITED STATES PATENTS

| | | | |
|---|---|---|---|
| 912,215 | 2/1909 | Warren | 74—493 X |
| 1,031,637 | 7/1912 | Fischer | 287—58 X |
| 2,062,628 | 12/1936 | Yannetta | 287—58 X |
| 2,744,419 | 5/1956 | Chayne | 74—493 |
| 2,792,719 | 5/1957 | Lanzone | 74—493 |
| 2,796,881 | 6/1957 | Scheiwer. | |
| 2,800,190 | 7/1957 | Dvorak | 74—493 X |
| 2,970,458 | 2/1961 | McLerran | 64—23.7 |

FOREIGN PATENTS 514,351   2/1955   Italy.

FRED C. MATTERN, Jr., *Primary Examiner.*

C. F. GREEN, *Assistant Examiner.*